Figure 1:
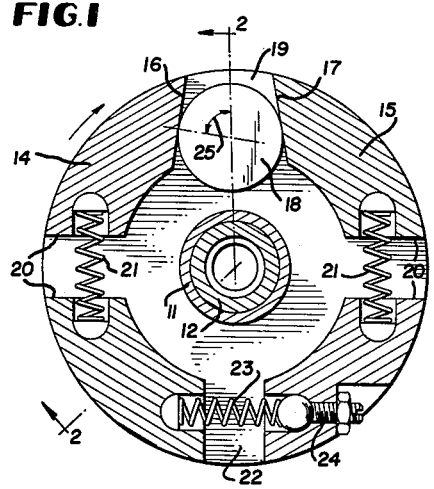

Nov. 14, 1961  D. MEHLITZ  3,008,313
SPEED-RESPONSIVE COUPLING

Filed March 1, 1960  2 Sheets-Sheet 1

INVENTOR.
DIETER MEHLITZ
BY
Dicke, Craig & Freudenberg
ATTORNEYS

Nov. 14, 1961     D. MEHLITZ     3,008,313
SPEED-RESPONSIVE COUPLING
Filed March 1, 1960     2 Sheets-Sheet 2
FIG.6
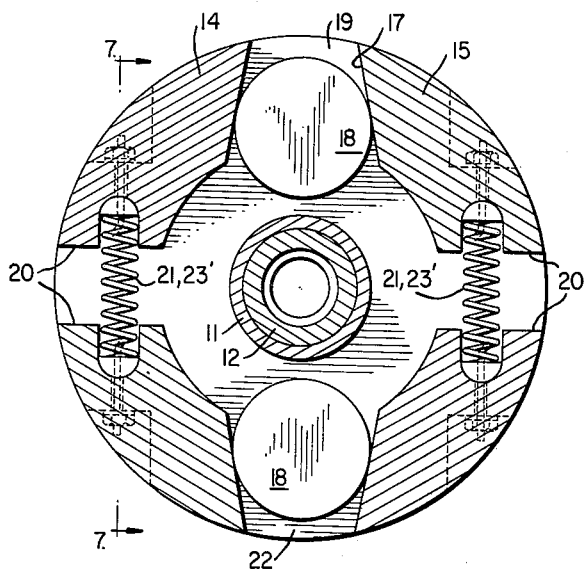
FIG.7
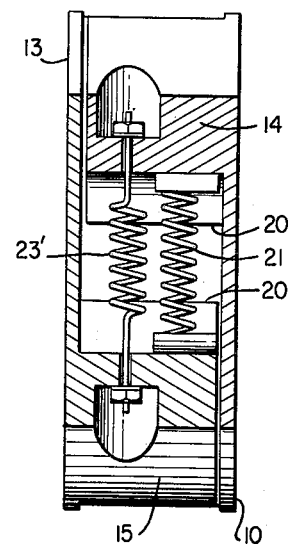
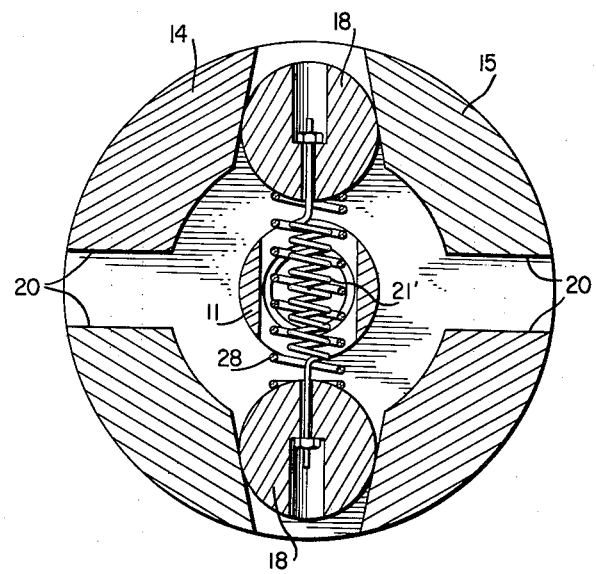
FIG.8
INVENTOR.
DIETER MEHLITZ
BY Dicke, Craig & Freudenberg
ATTORNEYS United States Patent Office 3,008,313
Patented Nov. 14, 1961

1

3,008,313
SPEED-RESPONSIVE COUPLING
Dieter Mehlitz, Neuhausen, Filder, Germany, assignor to Daimler-Benz Aktiengesellschaft, Stuttgart-Unterturkheim, Germany
Filed Mar. 1, 1960, Ser. No. 12,116
18 Claims. (Cl. 64—25)

The present invention relates to an installation for the angular adjusting displacement of two shafts with respect to each other in dependence on the rotational speed, especially for injection pumps in internal combustion engines, whereby the parts intended to be adjusted or displaced with respect to each other against the effect of countersprings interengage with each other in a segment-like manner, and in which the end surfaces of the segments disposed in the circumferential direction form roller-surfaces inclined with respect to each other for the roller-type centrifugal weights disposed therebetween.

For purposes of adjusting the injection point in injection pumps used with internal combustion engines, injection-adjusting devices of the type mentioned hereinabove are already known in the prior art. In these prior art devices, either both or only one of the roller-surfaces in the parts to be adjusted with respect to each other are curved cylindrically. These cylindrical roller-surfaces can be manufactured, however, only within a predetermined structurally limited range. Furthermore, such prior are devices entail the disadvantage that within the higher rotational speed, the angle proportional to the adjusting moment between the normal at the point of contact of the roller curve and the radial distances from the center of the injection-adjusting device to the center of the centrifugal weight has become too small, which requires in practice excessively large flyweights and also altogether excessively large masses to be assembled and installed.

The present invention is concerned with the provisions of an injection-adjusting device adapted to be manufactured relatively inexpensively and having relatively small dimensions as well as a relatively large output capacity.

The problems in connection with adjusting devices of the type mentioned hereinabove are solved in accordance with the present invention by constructing both roller-surfaces coordinated to a respective flyweight in a planar manner and by interposing between the parts intended to be mutually displaced with respect to each other one or several adjusting springs in such a manner that the adjusting moment thereof is directed in the same sense as that of the flyweight.

The construction in accordance with the present invention provided with plane roller-surfaces produces, in particular, considerably simplified manufacture, and within the higher rotational speed range, the desired larger angle between the perpendicular to the point of contact of the roller curve and the radial distances from the center of the injection-adjusting device to the center of the flyweight. Such an arrangement results in a large superiority of the device in relation to number and size of the flyweights as well as with respect to the installed masses and resulting inertia thereof.

By the use of the adjusting springs in accordance with the present invention, it is possible to achieve an arrangement in such a manner that the counterspring or countersprings need no longer be assembled with an extremely

2 small pretensioning thereof, so that no excessive requirements are made as regards manufacturing accuracies and tolerances and the finishing operations are further simplified.

It may thereby be appropriate to render the tension of the adjusting and/or countersprings to be adjustable. The segments of the two parts may be operatively connected, on the one hand, by the flyweights and the adjusting springs, and, on the other, by the countersprings acting in opposition to the flyweights.

The construction of the springs themselves may be of any suitable type although it is preferable, in accordance with the present invention, to construct the adjusting springs as coil springs effective in the circumferential direction and subjected to compression loads and to interpose the same at the places corresponding to the flyweights or adjacent the same between the segments. According to another construction in accordance with the present invention provided with springs acting in a circumferential direction, the adjusting springs and countersprings are interposed adjacent each other at the same places between the segments, and the adjusting springs are constructed as tension springs, whereas the countersprings are constructed as compression springs.

It is also feasible within the purview of the present invention to coordinate the adjusting springs and/or the countersprings to the flyweights so as to be effective radially with respect thereto. One possibly of such construction essentially consists in supporting two oppositely disposed flyweights on a common adjusting spring.

Accordingly, it is an object of the present invention to provide an automatic adjusting mechanism for automatically adjusting the angular position of two shafts with respect to each other which obviates the shortcomings and inadequacies of the prior art devices.

Another object of the present invention is the provision of a speed-responsive angular adjusting installation for two shafts, especially for injection pumps of internal combustion engines in which the dimensions of the various parts may be kept relatively small and in which in particular the flyweight may be made of relatively small size and small masses.

Another object of the present invention resides in the provision of a speed-responsive automatic adjusting device for automatically adjusting the angular position of two shafts with respect to each other, in which the speed-responsive means, in the form of centrifugal weights, are adapted to move along roller-surfaces which may be readily manufacture.

Another object of the present invention resides in the provision of an automatic adjusting device for adjusting the angular position of two shafts with respect to each other in dependence on the rotational speed thereof which makes possible a relatively large adjusting range therebetween.

Still another object of the present invention resides in the provision of a speed-responsive adjusting device for adjusting the relative angular position between two shafts which does not require springs offering spring characteristics of high accuracy and therewith springs which entail excessive manufacturing costs.

Figure 4:
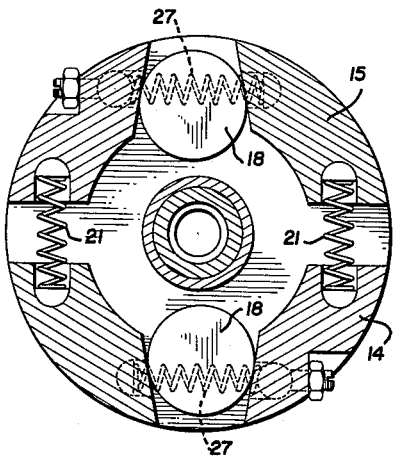
Figure 2:
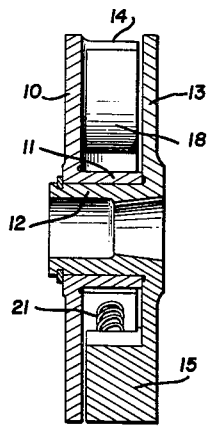
Figure 5:
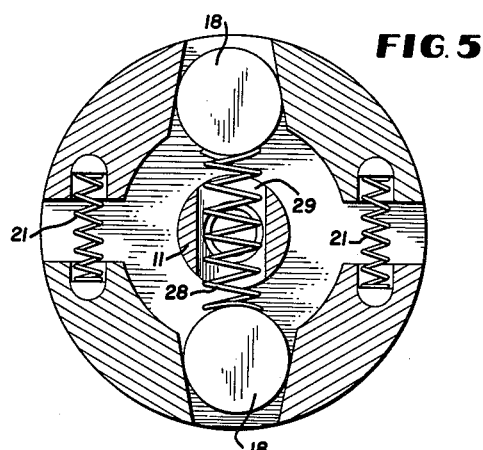
Figure 3:
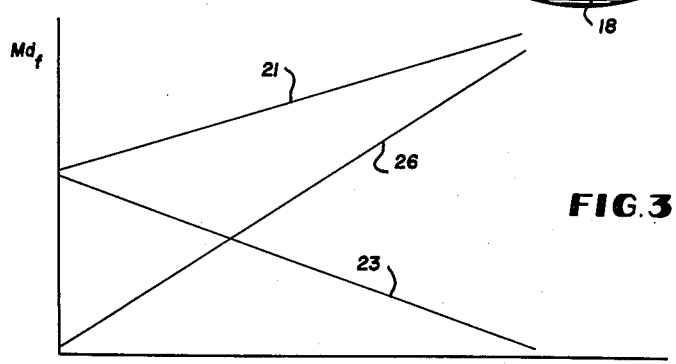

These and other objects, features and advantages of the present invention will become more obvious from the following description, when taken in connection with the accompanying drawing, which shows, for purposes of illustration only, several embodiments in accordance with the present invention and wherein FIGURE 1 is a longitudinal, cross-sectional view through a first embodiment of an adjusting mechanism for a fuel injection pump in accordance with the present invention, FIGURE 2 is a transverse, cross-sectional view taken along line 2—2 of FIGURE 1, FIGURE 3 is a diagram illustrating the spring characteristics of the springs used in accordance with the present invention, FIGURE 4 is a longitudinal, cross-sectional view through a modified embodiment of an adjusting mechanism in accordance with the present invention, FIGURE 5 is a longitudinal, cross-sectional view through still another modified embodiment of an adjusting mechanism in accordance with the present invention, FIGURE 6 is a longitudinal, cross-sectional view through still another modified embodiment of an adjusting mechanism in accordance with the present invention, FIGURE 7 is a transverse, cross-sectional view taken along line 7—7 of FIGURE 6, and FIGURE 8 is a longitudinal, cross-sectional view through a further modified embodiment of an adjusting mechanism in accordance with the present invention.

Referring now to the drawing, wherein like reference numerals are used throughout the various views to designate corresponding parts and, more particularly, to FIGURES 1 and 2, the injection-adjusting mechanism illustrated therein essentially consists of a flange-like part 10 connected with the driving shaft (not illustrated) in any appropriate manner. The flange-like driving part 10 is supported with the hub portion 11 thereof on the hub portion 12 of a second flange-like part 13, which is operatively connected with the driven shaft (not shown).

Both flange-like parts 10 and 13 are provided with two or more oppositely disposed segment-like projections 14 and 15, respectively, which interengage into one another, whereby the segments 14 constitute the driving segments connected with the flange-like driving part 10 and the segments 15, the driven segments connected with the flange-like part 13. The end surfaces 16 and 17 of the segments 14 and 15, which face one another, thereby form the roller-surfaces for a roller-shaped flyweight 18. Both roller-surfaces 16 and 17 are constructed as plane surfaces. The surfaces 16 and 17 are inclined toward each other so that the slot 19 formed between the two segments 14 and 15 decreases in width in the radially outward direction and the part 13 is thereby rotated relative to the part 10 through a predetermined angle in the direction of the arrow during the radial movement of the flyweight 18 in the outward direction.

The other end surfaces 20 of the segments 14 and 15 are constructed so as to be parallel to each other. Countersprings 21 are arranged thereat which are constructed as compression springs and may possibly also be adjustable in the same manner as spring 23 described hereinafter.

An adjusting spring 23 is inserted into slot 22 between segments 14 and 15 which is disposed opposite slot 19 receiving the flyweight 18, whereby the segment end surfaces forming slot 22 are parallel to each other or possibly also inclined to each other. This adjusting spring 23 produces a moment directed in the same direction as the adjusting moment. The tension or pre-loading of spring 23 may be adjusted in any suitable manner, for example, by means of an adjusting screw 24.

*Operation*

The operation of the adjusting mechanism illustrated in FIGURES 1 and 2 is as follows:

The countersprings 21 effectuate that with a relatively low rotational speed in the direction of the arrow, the flyweight is pressed inwardly as far as possible. The spring force of the adjusting spring 23 opposes the spring forces of the springs 21. With an increasing rotational speed, the flyweight 18 is displaced outwardly as a result of the centrifugal force and thereby adjusts, aided by the adjusting spring 23, the segments 15 together with the part 13 in the direction of rotation of the arrow in opposition to the moment exerted by countersprings 21. With a radial movement of the flyweight toward the outside, the angle 25 between the perpendicular to the point of contact on the roller-curve and the radial line from the center of the adjusting mechanism to the center of the flyweight 18, which angle is proportional to the adjusting moment, is changed, and, more particularly, the angle 25 is considerably larger in the upper rotational speed range than with cylindrically shaped roller-surfaces which require for the most part countersprings having high spring characteristics.

FIGURE 3 illustrates as spring diagram the moment $Md_t$ produced by the two springs combined in dependence on the adjusting angle $\varphi$. As is clearly visible from FIGURE 3, with an increasing adjusting angle 25, i.e. the further the flyweight 18 moves radially outwardly, the moment of the adjusting spring 23 decreases, whereas the moment of the countersprings 21 increases. Both springs 21 and 23 together produce the resultant moment 26, which increases almost from zero to a maximum value thereof. If the adjusting spring 23 were omitted, then this characteristic line 26 would have to be attained exclusively by the use of countersprings 21. This, however, would entail extremely large difficulties because in that case the countersprings 21 would have to exhibit a very high spring characteristic and would have to be installed with relatively slight pre-tensioning or pre-loading.

The maximum deflection of the injection-adjusting device illustrated in FIGURES 1 and 2 is, of course, limited. For that purpose, an abutment (not illustrated) may be provided, for example, in such a manner that one or several countersprings 21 are supported in corresponding sleeves or bushings. These sleeves abut at the segments 14 and 15 with a predetermined adjusting angle and thereby provide a limit abutment.

FIGURE 4 illustrates an injection-adjusting mechanism having in principle the same construction as that of FIGURES 1 and 2. However, in the embodiment of FIGURE 4, two mutually opposite flyweights 18 are provided and the two adjusting springs 27 thereof are disposed adjacent the flyweights. The countersprings 21 are installed between the segments 14 and 15 in the manner described hereinabove in connection with FIGURES 1 and 2. In principle, one or several more springs each may be used as adjusting and/or countersprings.

It is also understood that within the purview and scope of the present invention, the countersprings and adjusting springs may be installed at the same places, i.e. for example, in the same mutually opposite slots between the segments 14 and 15 as illustrated in FIGURES 6 and 7. The countersprings 21 are thereby constructed as compression springs and the adjusting springs 23' as tension springs.

FIGURE 5 illustrates a modified embodiment with two oppositely disposed flyweights 18 which are supported on a single radially arranged common adjusting spring 28. The spring 28 is guided within a slot 29 in the hub portion 11, whereby the hub portion 12 of FIGURES 1, 2 and 4 may be dispensed with while the radial support of the driven part 13 may take place in any other suitable manner. The countersprings 21 may again be installed in the manner described hereinabove.

It is also understood that FIGURE 5, as well as any of the preceding embodiments, may be modified so that the countersprings 21 thereof become operative in the radial direction thereof. In such case, the countersprings are arranged as illustrated in FIGURE 8 wherein spring 21' serves as the counterspring.

While I have shown and described several embodiments in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications are encompassed by the scope of the appended claims.

I claim:

1. An installation for the angular adjustment of two shafts with respect to each other in dependence on the rotational speed thereof, comprising first shaft means having at least one essentially segment-shaped portion operatively connected therewith, second shaft means having at least one essentially segment-shaped portion operatively connected therewith, said segment-shaped portions interengaging with each other and being provided with roller-surface means at least at one set of mutually opposite faces thereof, roller-type flyweight means disposed between said roller-surface means operative to adjust said shaft means in dependence on the rotational speed thereof, said roller surface means being of plane configuration, counterspring means operatively connected with said shaft means and normally effective to oppose the adjusting displacement thereof produced by said flyweight means, and adjusting spring means operatively connected between said two shaft means for producing an adjusting moment directed in the same sense as that of said flyweight means.

2. An installation for angularly adjusting two shafts with respect to each other in dependence on the rotational speed thereof, especially for injection pumps of internal combustion engines, comprising first shaft means, second shaft means, said shaft means including segment-shaped portions interengaging with each other and provided with plane roller-surface means at least at one set of mutually opposite end faces thereof, roller-type flyweight means disposed between said roller-surface means for effecting said angular adjustment in dependence on the rotational speed, counterspring means operatively connected between said segment-shaped portions, and adjusting spring means operatively connected with said two shaft means for producing an adjusting moment directed in the same sense as that of said flyweight means.

3. An installation for producing an angular adjustment between two parts with respect to each other in dependence on the rotational speed thereof, especially for injection pumps of internal combustion engines, comprising first means, second means, said first and second means including segment-shaped portions operatively connected with respective means and interengaging with each other, said segment-shaped portions being provided with roller-surfaces at least at one set of mutually opposite end faces thereof, said roller-surface being of plane configuration, roller-type flyweight means disposed between said roller surfaces, counterspring means effectively interposed between said segment-shaped portions and normally opposing the angular adjustment produced by said flyweight means in the direction thereof corresponding to an increase in the rotational speed of said parts, and adjusting spring means effectively interposed between said segment-shaped portions for producing an adjusting moment on said segment-shaped portions directed in the same sense as that produced by said flyweight means with an increase in the rotational speed of said parts.

4. An installation for producing an angular adjustment between two parts according to claim 3, wherein said adjusting spring means are adjustable in the spring tension thereof.

5. An installation for producing an angular adjustment between two parts according to claim 3, wherein said counterspring means are adjustable in the spring tension thereof.

6. An installation for producing an angular adjustment between two parts according to claim 3, wherein both said counterspring means and said adjusting spring means are adjustable in the spring tension characteristics thereof.

7. An installation for producing an angular adjustment between two parts according to claim 6, further comprising adjusting screw means for adjusting the spring tension characteristics of each of said counterspring means and said adjusting spring means.

8. An installation for producing an angular adjustment between two parts according to claim 3, wherein said segment-shaped portions are operatively connected with each other, on the one hand, by said flyweight means and said adjusting spring means, and on the other, by said counterspring means.

9. An installation for producing an angular adjustment between two parts according to claim 8, wherein said adjusting spring means are constructed as coil springs subjected to compression loads.

10. An installation for producing an angular adjustment between two parts according to claim 9, wherein said coil springs are arranged at places corresponding to those of said flyweight means.

11. An installation for producing an angular adjustment between two parts according to claim 9, wherein said coil springs are arranged adjacent said flyweight means.

12. An installation for producing an angular adjustment between two parts according to claim 8, wherein said counterspring means and said adjusting spring means are interposed between said segment-shaped portions at the same places alongside each other, and wherein said adjusting spring means are constructed as tension springs and said counterspring means are compression springs.

13. An installation for producing an angular adjustment between two parts according to claim 3, wherein said adjusting spring means are operatively connected with said flyweight means so as to be effective in the radial direction thereof.

14. An installation for producing an angular adjustment between two parts according to claim 3, wherein said counterspring means are arranged between said flyweight means to be effective in the radial direction thereof.

15. An installation for producing an angular adjustment between two parts according to claim 3, wherein said counterspring means and said adjusting spring means are operatively connected between said flyweight means to be effective in the radial direction thereof.

16. An installation for producing an angular adjustment between two parts according to claim 15, wherein one of said spring means abuts with the two ends thereof against radially opposite flyweight means and extends through a slot provided in the hub portion of one of said two parts.

17. An installation for producing an angular adjustment between two parts according to claim 3, wherein one of said two spring means consisting of said counterspring means and said adjusting spring means is operative in the circumferential direction and wherein the other of said two spring means is operative in the radial direction and abuts at least at one end thereof with one of said flyweight means.

18. An installation for producing an angular adjustment between two parts with respect to each other in dependence on the rotational speed thereof, especially for injection pumps of internal combustion engines, comprising a first part constituting the driving part having a hub portion and segment-shaped portions disposed thereabout, a second part constituting the driven part including segment-shaped portions facing said first segment-shaped portions and of complementary shape so as to interengage therewith, at least one roller-type flyweight disposed between mutually opposite faces of segment-shaped portions belonging to said first and second part, said mutually opposite faces being of planar configuration, counterspring means operatively connected between the segment-shaped portions of said two parts and normally operative to produce a spring force seeking to oppose any adjustment of said parts in the direction of an increase in the rotational speed, and adjusting spring means operatively disposed between said segment-shaped portions and normally aiding said adjustment between said two parts in the direction of an increase in the rotational speed, the spring characteristics of said counterspring means and of said adjusting spring means being so matched with respect to each other that the resulting moment produced by said spring means is approximately zero with zero angular displacement and increases essentially linearly with the angular adjustment thereof.

References Cited in the file of this patent

UNITED STATES PATENTS

| | | |
|---|---|---|
| 1,105,628 | Diemer | Aug. 4, 1914 |
| 1,235,130 | Fuchs | July 31, 1917 |
| 1,304,768 | Henderson | May 27, 1919 |
| 2,265,981 | Bird | Dec. 16, 1941 |